(No Model.) 13 Sheets—Sheet 1.

H. SECK.
ROLLER MILL FOR GRINDING CORN, &c.

No. 248,802. Patented Oct. 25, 1881.

(No Model.)  13 Sheets—Sheet 2.
H. SECK.
ROLLER MILL FOR GRINDING CORN, &c.
No. 248,802.  Patented Oct. 25, 1881.

(No Model.)  H. SECK.  13 Sheets—Sheet 3.

ROLLER MILL FOR GRINDING CORN, &c.

No. 248,802.  Patented Oct. 25, 1881.

Witnesses,
F. L. Ourand
Inventor
Heinrich Seck
by his attorney (No Model.) 13 Sheets—Sheet 5.
H. SECK.
ROLLER MILL FOR GRINDING CORN, &c.

No. 248,802. Patented Oct. 25, 1881.

(No Model.)

13 Sheets—Sheet 6.

H. SECK.

ROLLER MILL FOR GRINDING CORN, &c.

No. 248,802. Patented Oct. 25, 1881.

(No Model.)  13 Sheets—Sheet 7.
H. SECK.
ROLLER MILL FOR GRINDING CORN, &c.
No. 248,802.  Patented Oct. 25, 1881.
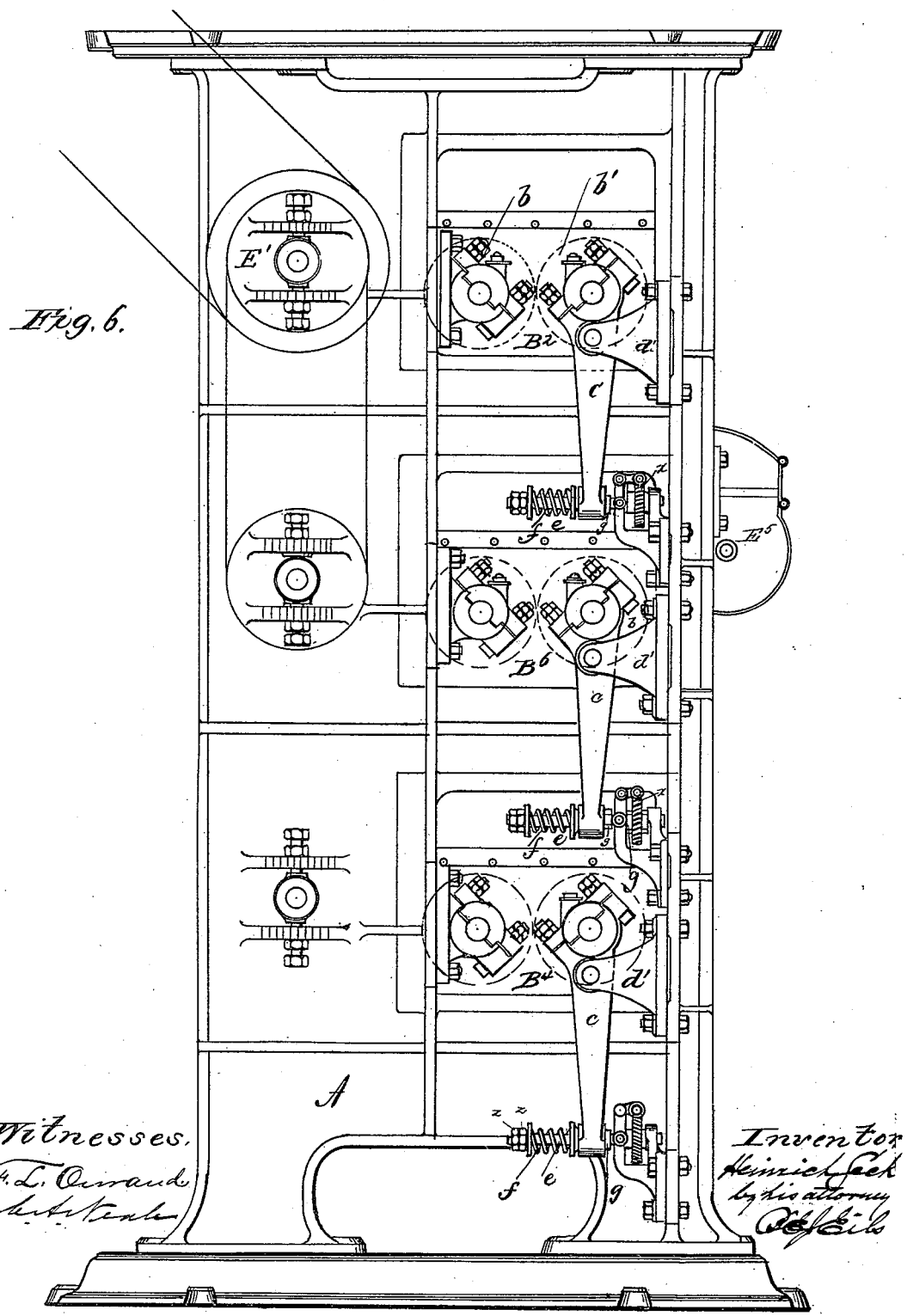

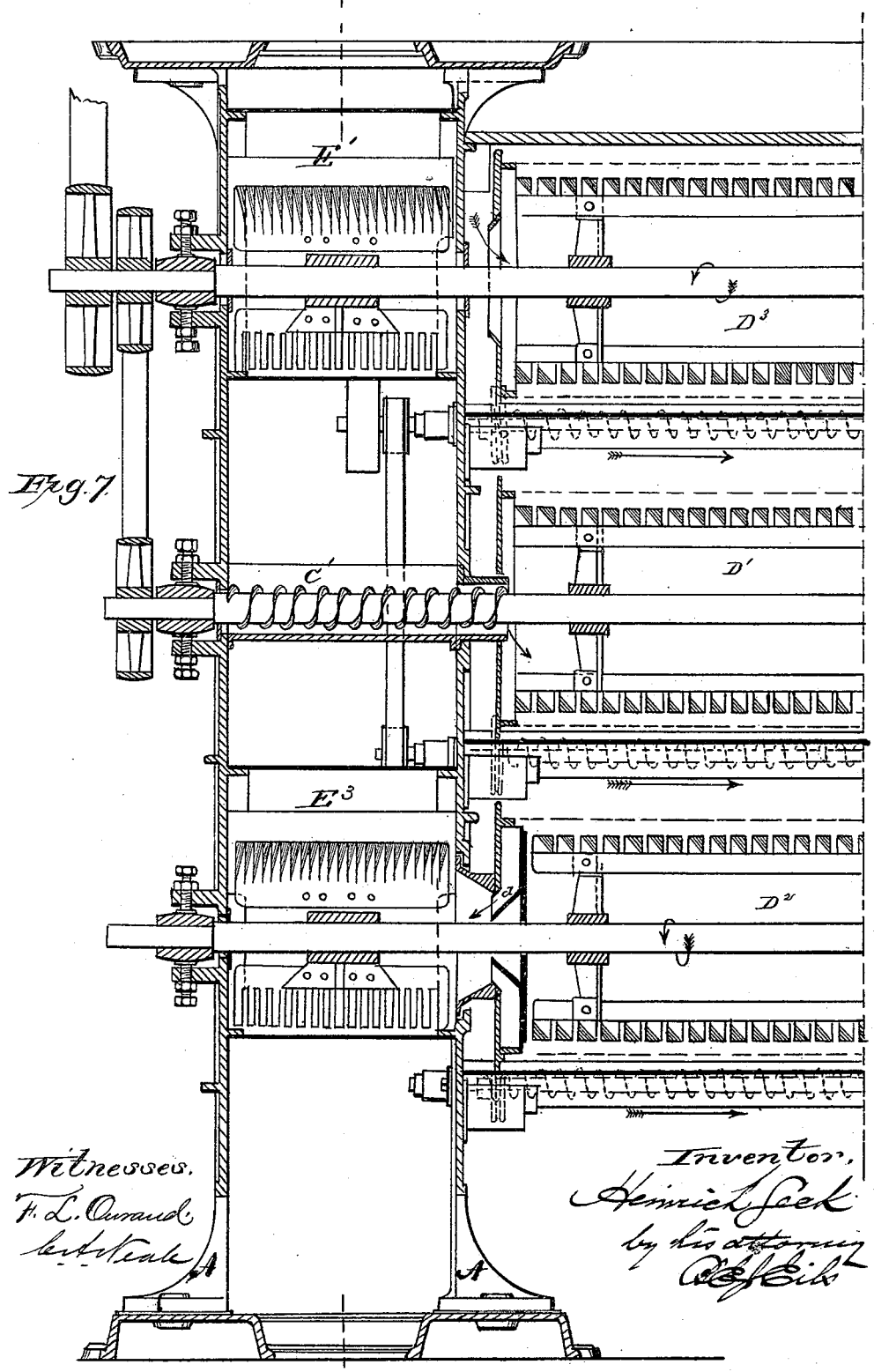

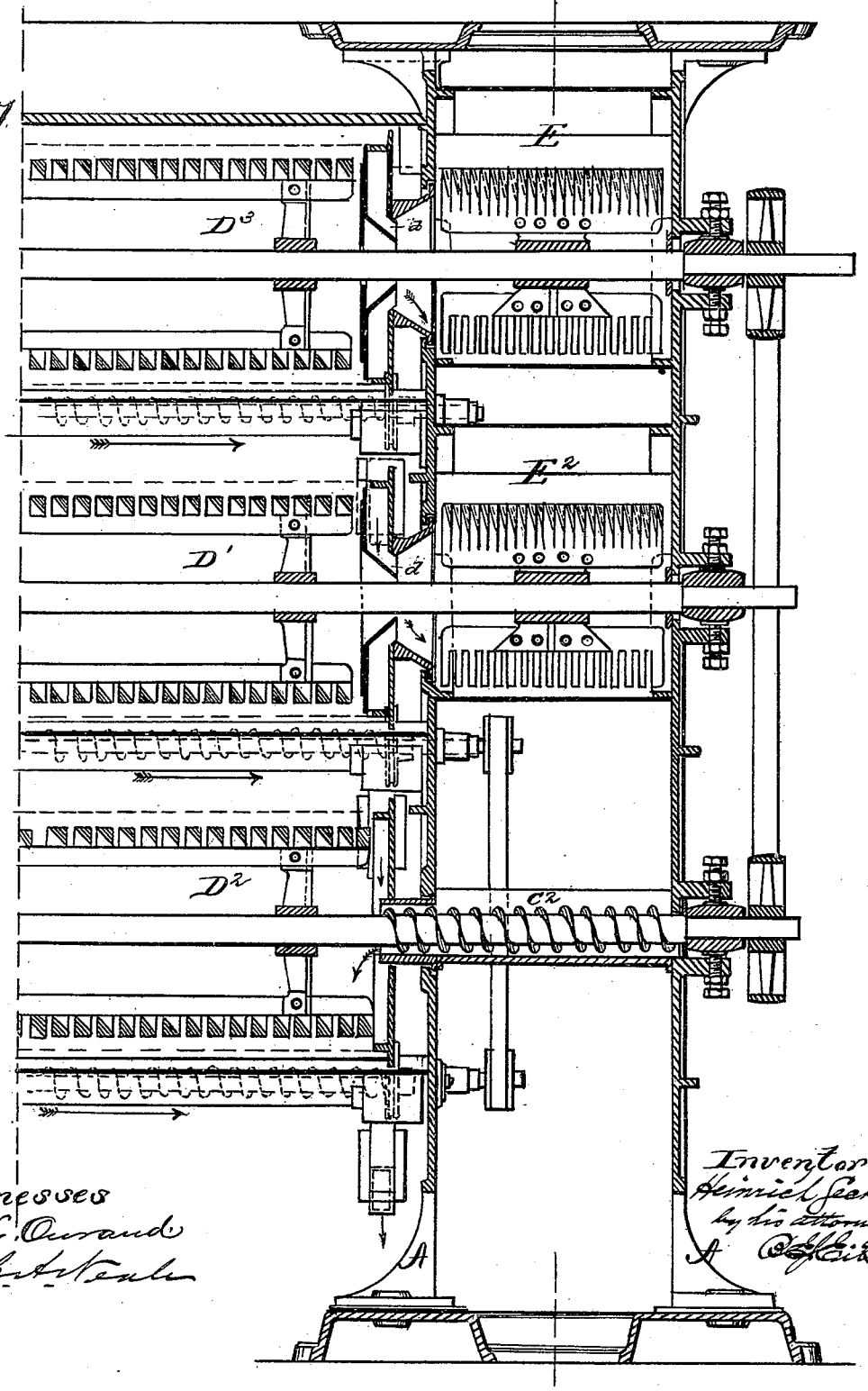

(No Model.)  13 Sheets—Sheet 10.

H. SECK.
ROLLER MILL FOR GRINDING CORN, &c.

No. 248,802. Patented Oct. 25, 1881.

Witnesses,
Inventor,

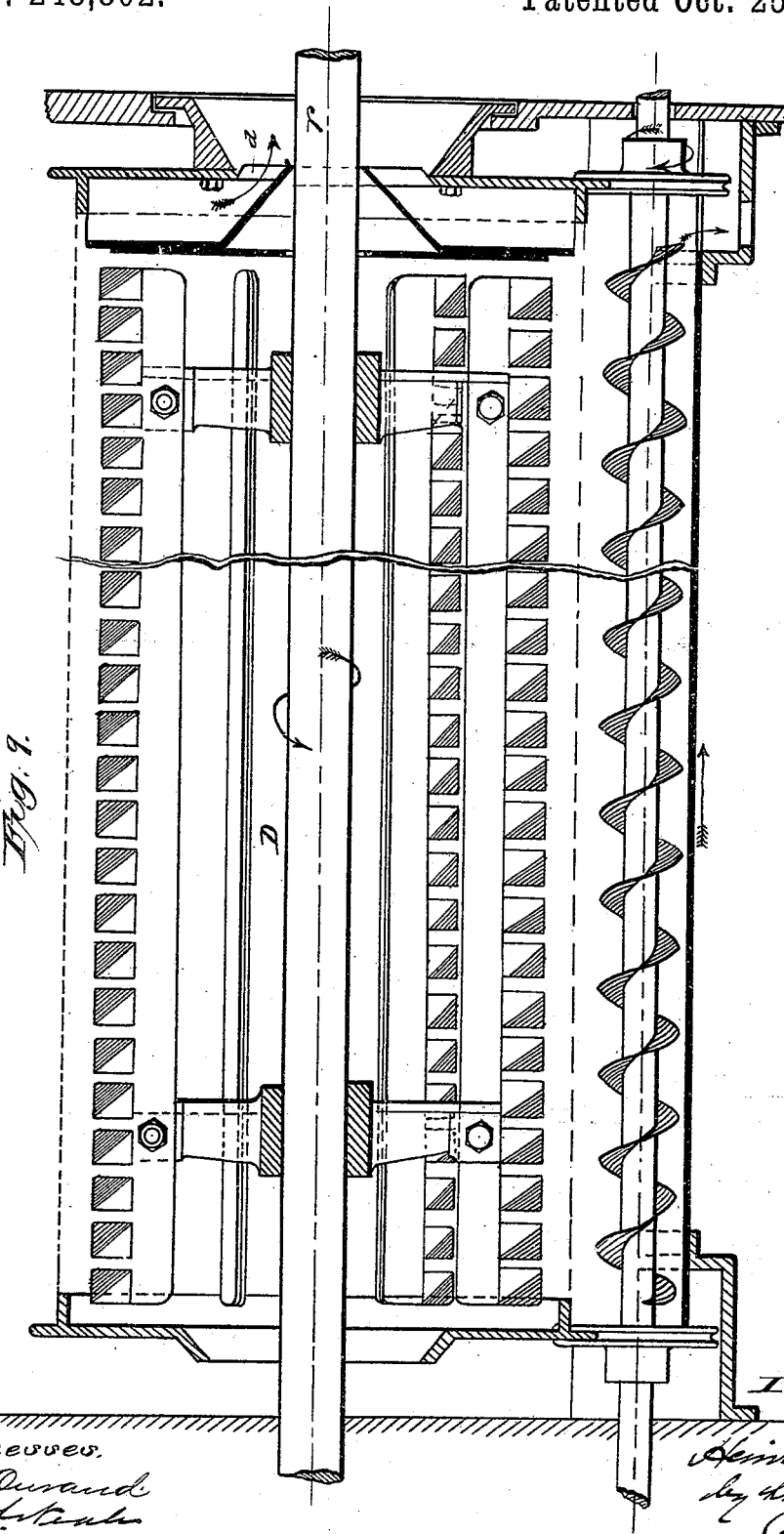

(No Model.)  
13 Sheets—Sheet 12.
H. SECK.
ROLLER MILL FOR GRINDING CORN, &c.
No. 248,802.  Patented Oct. 25, 1881.
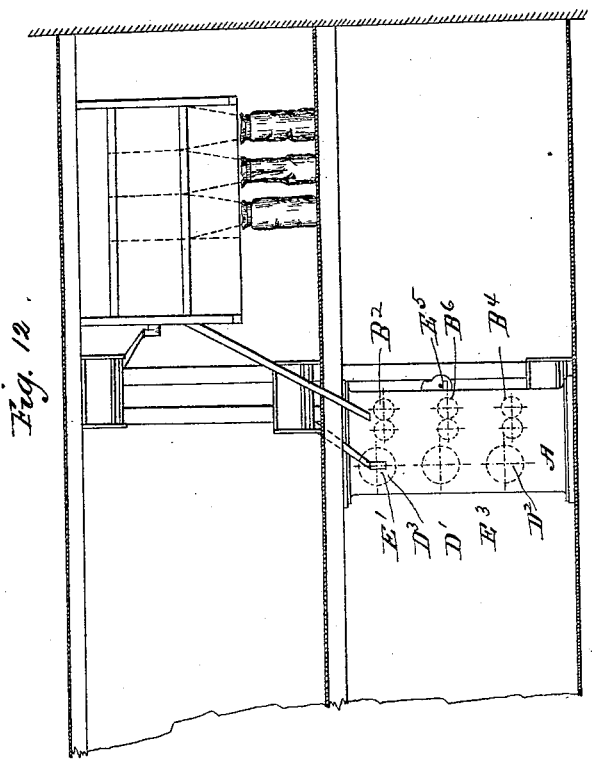
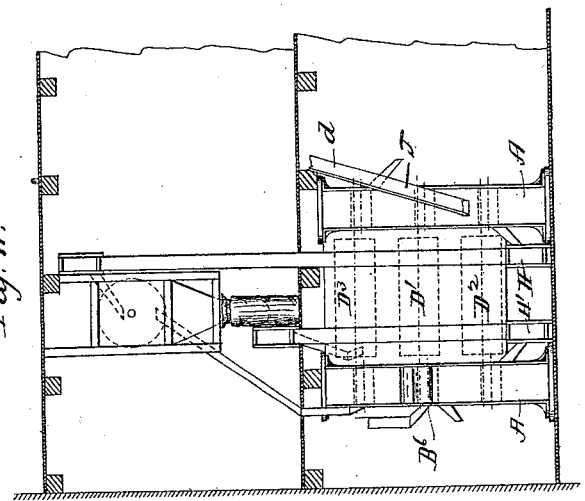

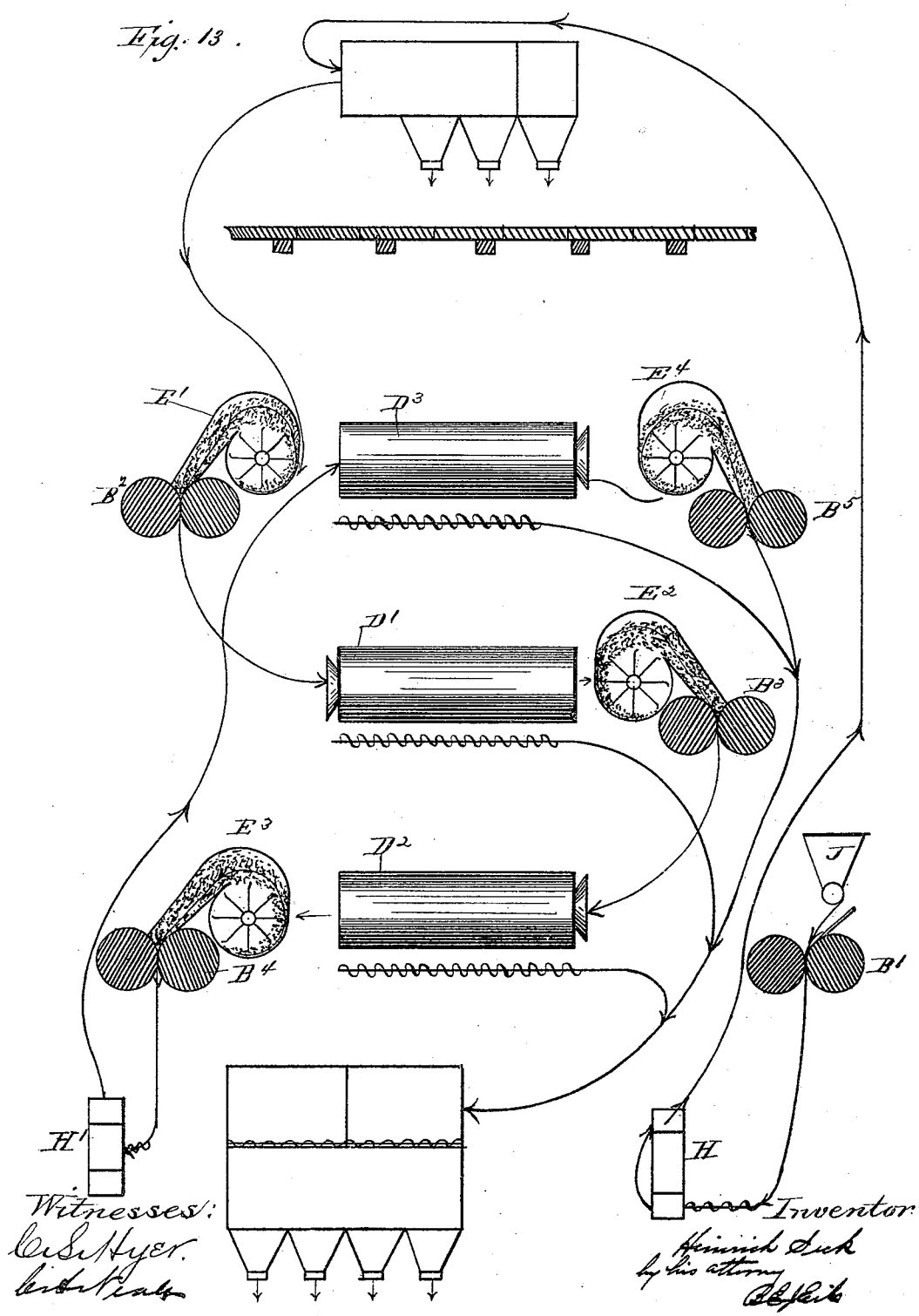

UNITED STATES PATENT OFFICE.

HEINRICH SECK, OF FRANKFORT-ON-THE-MAIN, PRUSSIA, GERMANY.

ROLLER-MILL FOR GRINDING CORN, &c.

SPECIFICATION forming part of Letters Patent No. 248,802, dated October 25, 1881.

Application filed July 1, 1881. (No model.)

*To all whom it may concern:*

Be it known that I, HEINRICH SECK, of Frankfort-on-the-Main, Germany, in the Province of Hesse-Nassau and Kingdom of Prussia, have invented a new and useful Improvement in Roller-Mills for Grinding Corn and the Like Products into Flour, of which the following is a specification.

This invention relates to improved machinery whereby the process of converting grain into flour or meal is carried out in successive stages; and it consists, first, in the combination, with screening or dressing apparatus and crushing or grinding cylinders or rollers, of centrifugal feed apparatus; secondly, in the new construction of a centrifugal feed apparatus, as hereinafter referred to, serving for the purpose of feeding or delivering the dressed grain to the grinding-rollers, and of obtaining a uniform feed or delivery over the whole length of the said rollers.

The object of the first part of my said invention is to provide better means than were provided by the feeding-rollers heretofore used for feeding or delivering the grist or grains to the grinding-rollers, and also to dispense thereby with the elevators applied for filling the hoppers of the said feeding-rollers. From this there results considerable economy with regard to space in mounting such machinery, while at the same time, during the operation of such machinery, attending the same is rendered by far easier, and is connected with less loss of time. Furthermore, by applying centrifugal feed apparatus a more uniform delivery is obtained than by using feeding-rollers, particularly when grinding branny grist.

My invention is shown in the accompanying drawings; and in these drawings—

Figure 1:
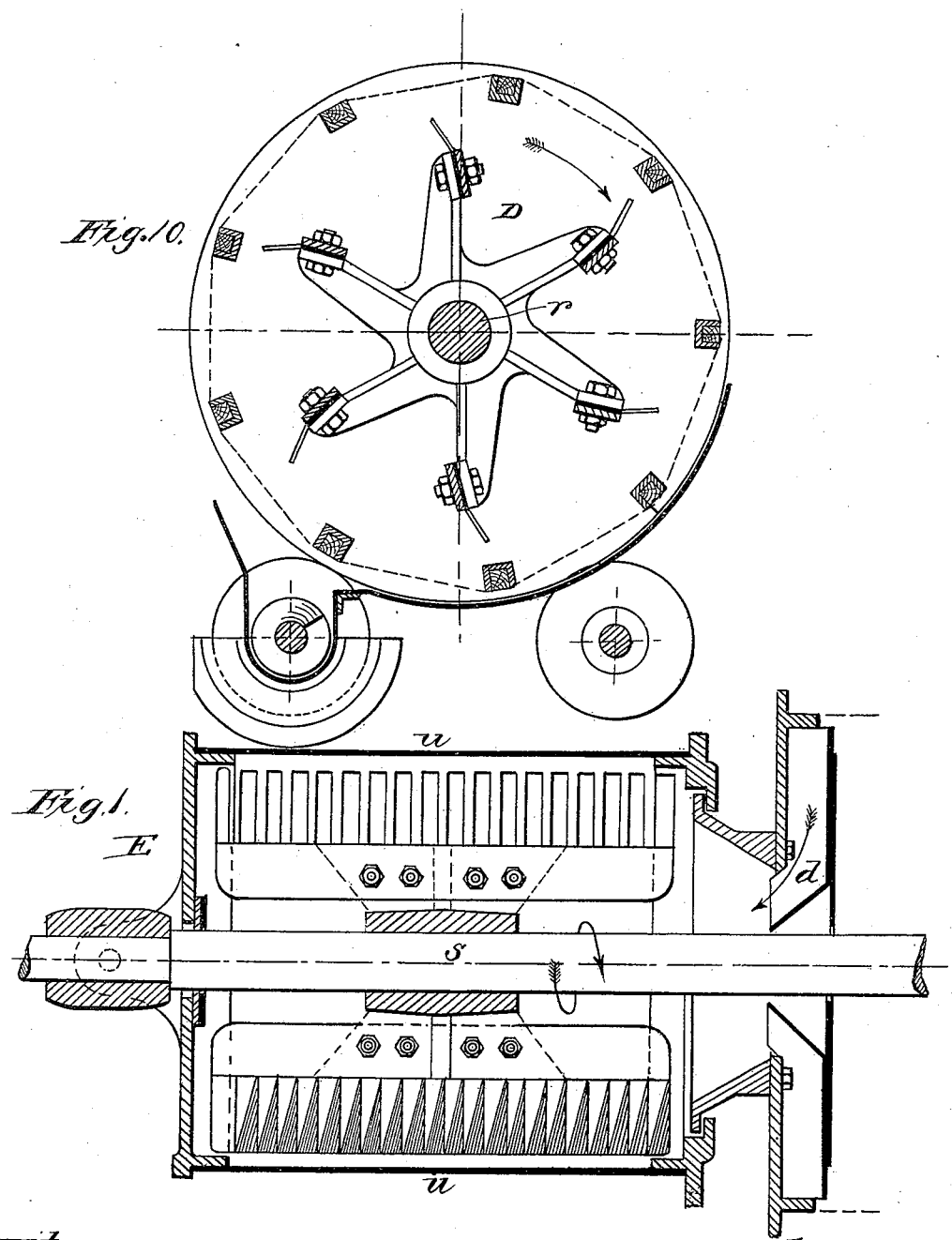
Figure 2:
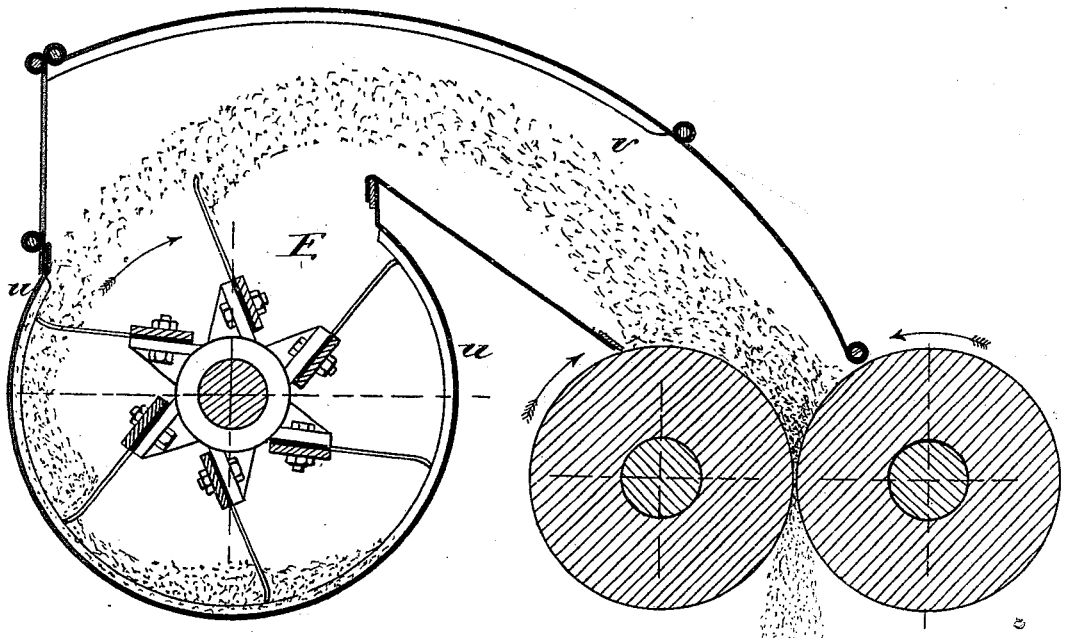
Figure 3:
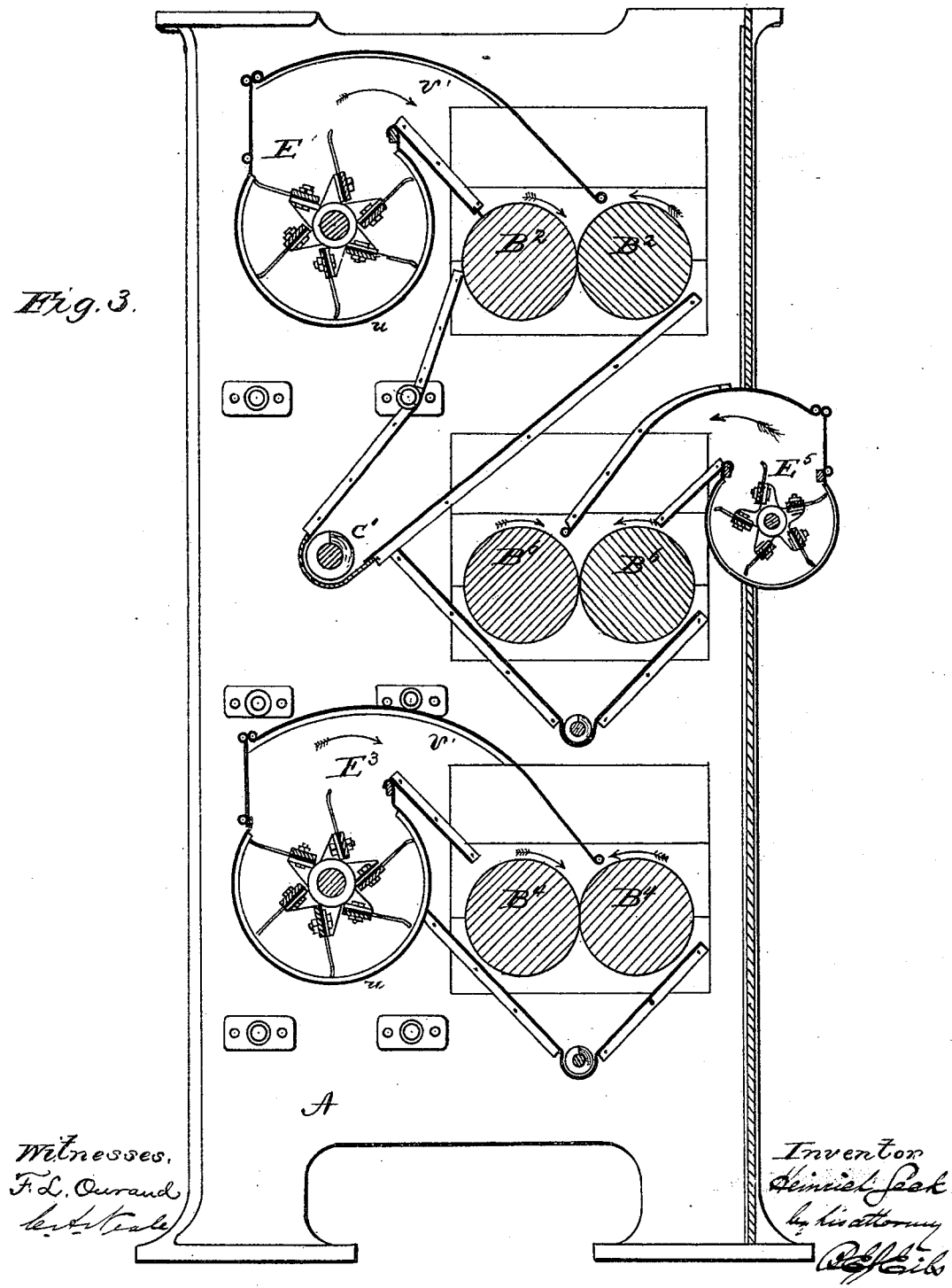
Figure 4:
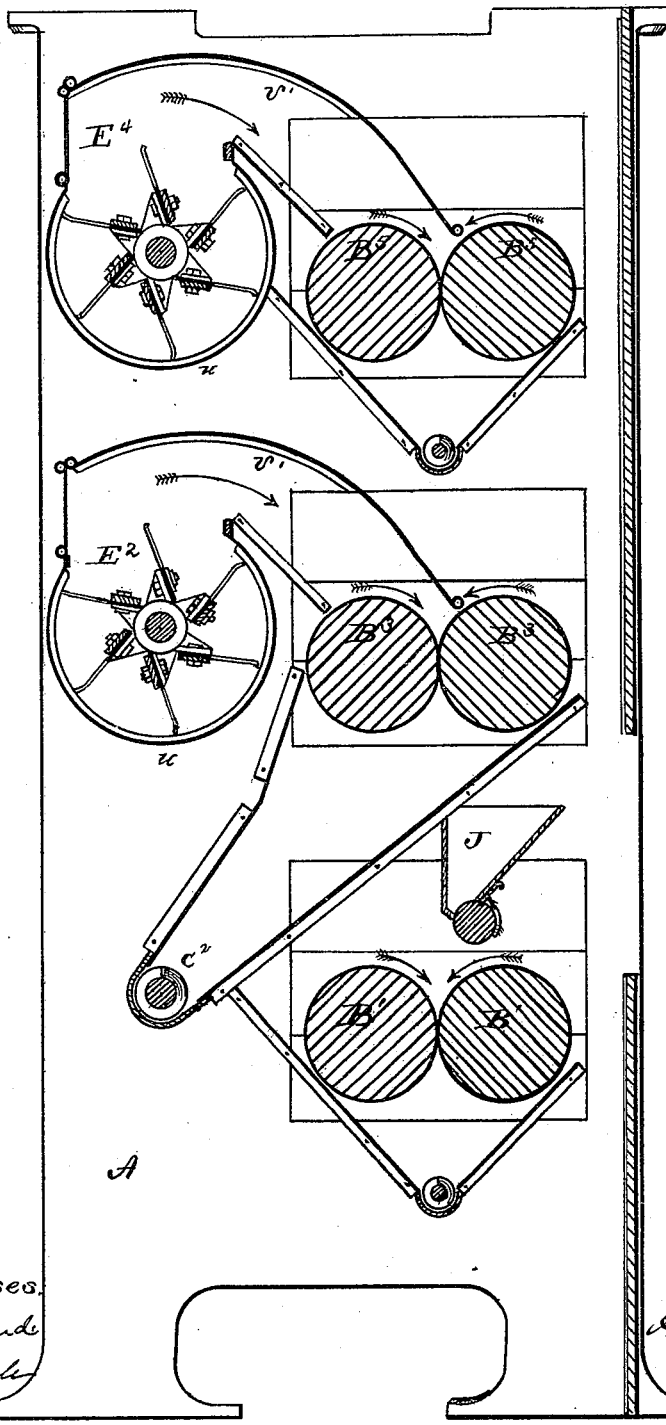
Figure 5:
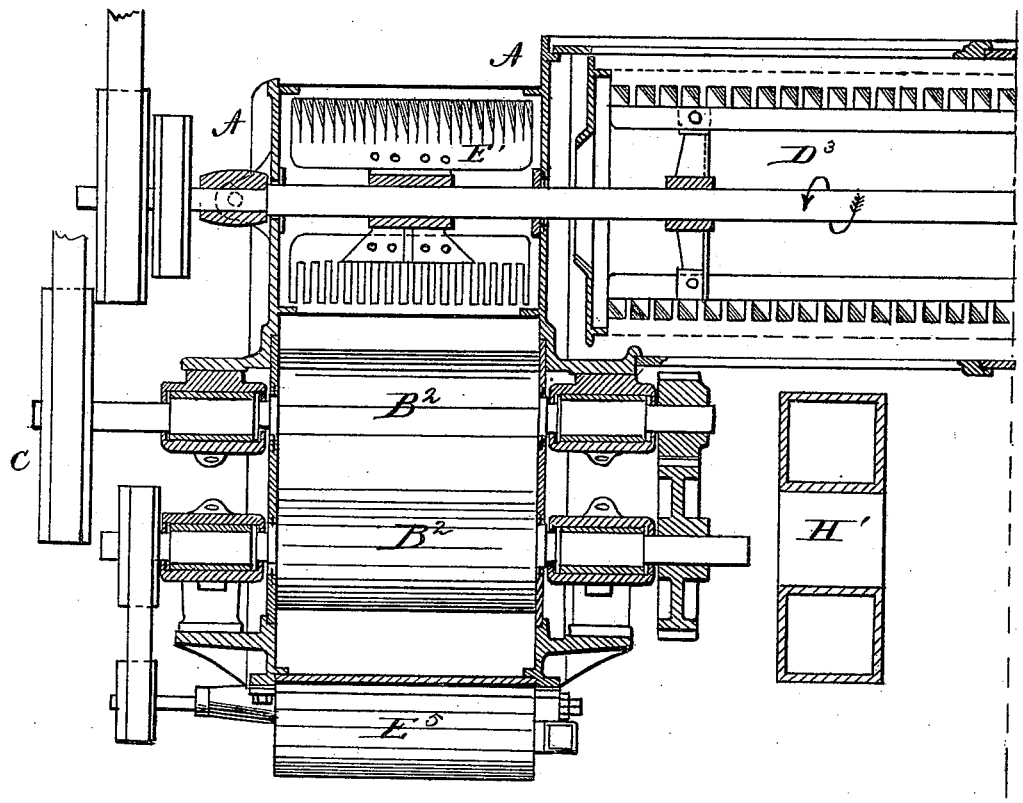
Figure 5:
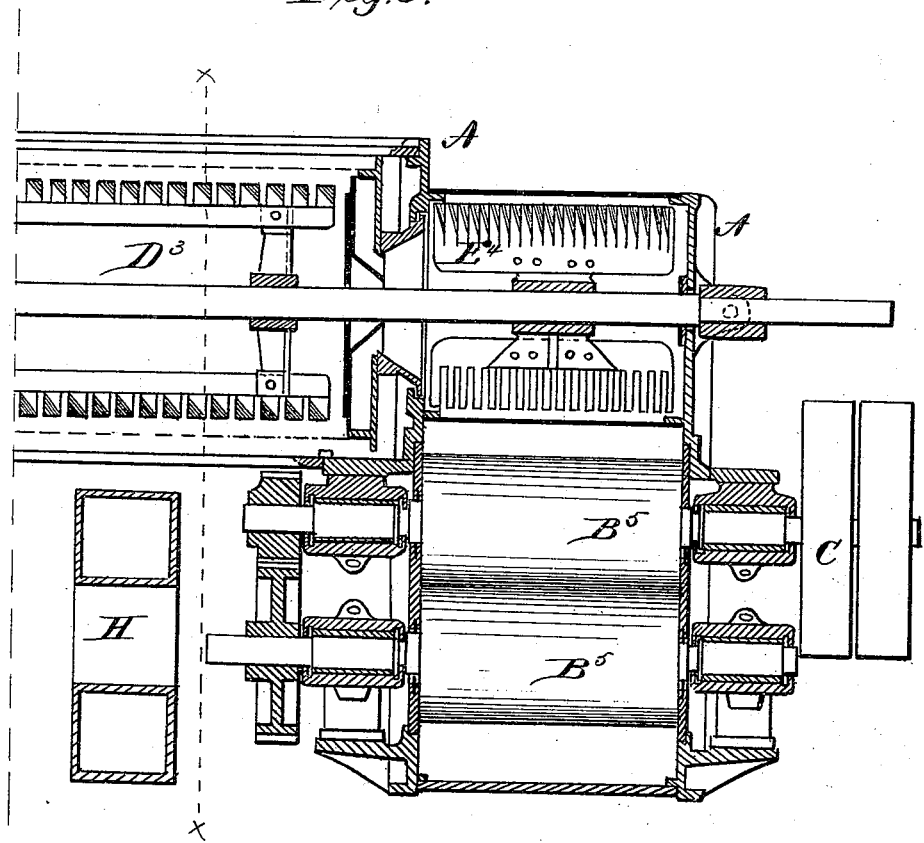
Figure 8:
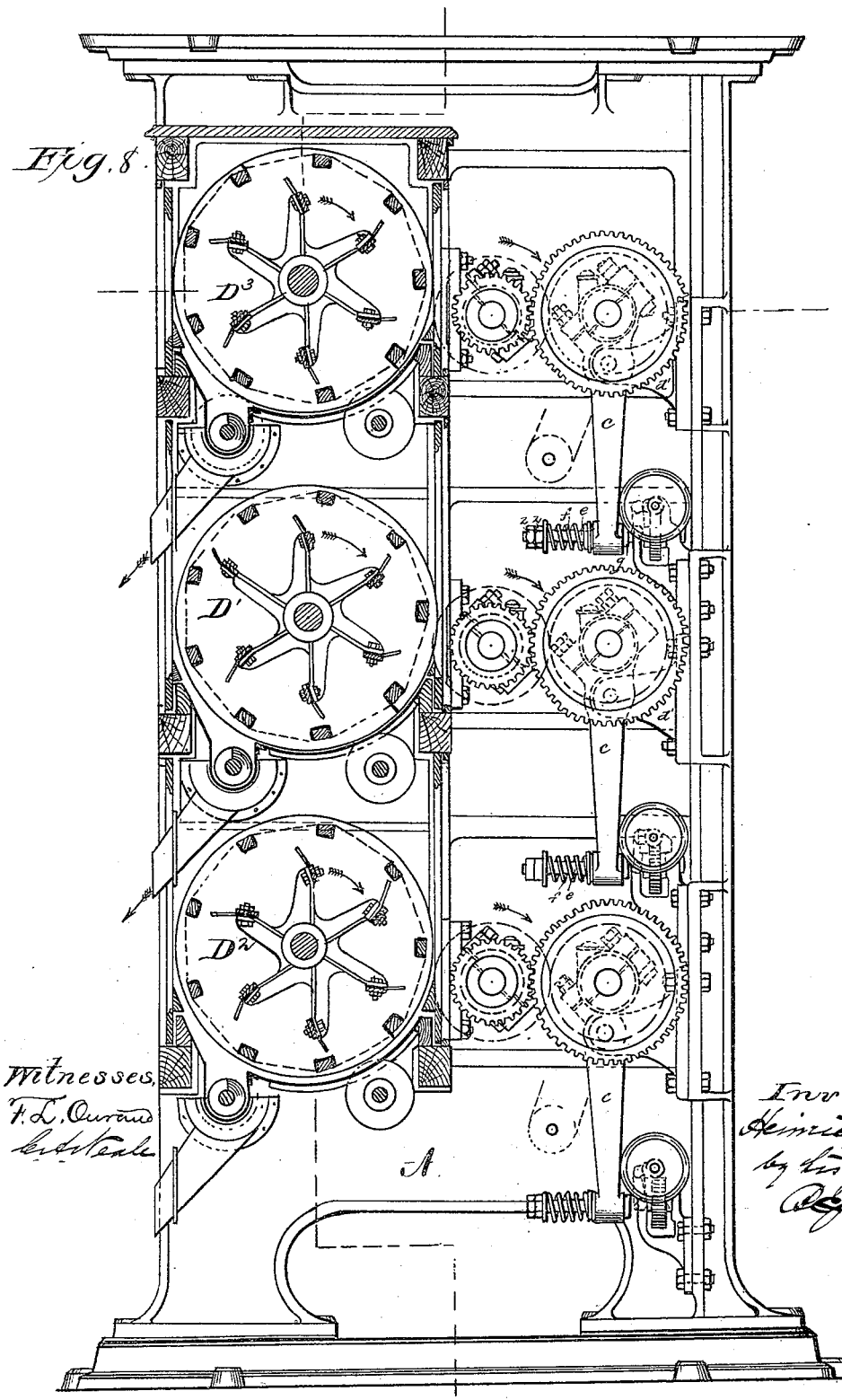

Figure 1 is a longitudinal section of my improved centrifugal feed apparatus. Fig. 2 is a vertical transverse section of the same. Figs. 3, 4, and 5 are longitudinal and transverse sectional views of machinery for converting grains into flour, showing the combination, with screening apparatus and crushing-cylinders, of centrifugal feed apparatus. Fig. 6 is an elevation of the combined machine. Fig. 7 is a longitudinal section, showing the position of the centrifugal feed apparatus with relation to the dressing apparatus. Fig. 8 is a vertical transverse section of the machine on line $xx$, Fig. 5. Fig. 9 is a sectional detail view of the dressing apparatus. Fig. 10 is a transverse section of the same. Figs. 11 and 12 represent, in front and side elevation, the general arrangement of the complete machine. Fig. 13 is a diagram of the machine, showing the course of the grain during the successive steps of grinding and separating. Fig. 5 occupies Sheets 5 and 6. Fig. 7 occupies Sheets 8 and 9.

The construction and arrangement of the centrifugal feed apparatus shown in the drawings will now be described; but I wish it to be clearly understood that I do not confine myself to applying exactly the same centrifugal feed apparatus shown, and hereinafter described, as it is not the centrifugal feed apparatus in itself, but the new mode of combining such or similar apparatus with grinding-rollers and screening apparatus, that forms the essential part of my present invention.

The centrifugal feed apparatus E is either fixed on the shaft of the dressing or screening apparatus, said shaft extending in the direction of the respective pair of grinding-rollers, or it may be fixed on a separate shaft, $s$, Fig. 1. The beaters of this apparatus consist of a number of more or less radial blades corresponding with regard to their length with the length of the grinding-rollers. The separate blades or beaters are made sufficiently broad, and are slotted or slit radially in such a manner as to divide each blade into a number of narrower blades, (sections or floats,) thereby forming a kind of rake. This centrifugal feed apparatus is surrounded by a casing, $u$, in such a manner that at its upper side there will be an opening of sufficient width to connect with the feed-channel $v$. The grist to be fed enters the centrifugal feed apparatus at or about the axial center of its head, as shown at $d$, Figs. 1, 11, and 12. This may be effected either by means of a common pipe, or the dressing apparatus may be so arranged as to deliver said grist directly to the centrifugal feed apparatus.

In order to uniformly distribute the grist entering at the head $d$ of the centrifugal feed apparatus over the entire length of the latter and over the length of the grinding-rollers, the said sections of part of the blades are set or twisted with a gradually-decreasing inclination, (see Figs. 1, 5, and 7,) in such a manner as, in consequence of their being twisted, to act in a worm-like manner. The said twisted sections serve for the purpose only of transferring the grist from the one end of the centrifugal feed apparatus to the other or opposite end of the same, while the remaining straight part of the blades will act so as to throw the grist into the feed-channel $v$. As the action of the feeding will be continual, and as the grist cannot accumulate within the centrifugal feeding apparatus, the distribution of the material will always take place very uniformly, so that all stowing is excluded.

The operation of centrifugal feed apparatus in combination with dressing apparatus and grinding-rollers will now be described.

A A are uprights, made of cast-iron or other convenient material, which carry the bearings of the dressing apparatus, and to which are fastened the bearings for the grinding-rollers $B'$ to $B^6$, which have pulleys C on their axes, by which they receive rotary motion.

$D'$ to $D^3$ are screening or dressing apparatus, which screen and sort the rolled material (grist, meal, or middlings) delivered from the grinding-rollers.

$E'$ to $E^4$ are centrifugal feed apparatus, which take the coarser grist from the respective dressing apparatus and deliver the same to the next grinding-rollers.

$E^5$ is a centrifugal feed apparatus of smaller dimensions, for delivering into the grinding-rollers $B^6$ finer grist entering through a pipe. The feed apparatus $E^5$, which supplies the grinding-rolls $B^6$, is not fed from this machine, but the apparatus is placed in the machine-frame to utilize space that would otherwise be vacant, and it can be used for any separate grinding that is required.

The drawings show a system for roller-mills in which grain is subjected to a fivefold reduction or granulating process with intermediate dressing. The grain is fed from the hopper J, Figs. 4 and 13, over a common feed-roller, to the grinding-rollers $B'$, where it is first crushed. For the separation of the flour and middlings produced (which are always screened at the first grinding operation) the crushed grain may be led by an elevator, H, to another floor of the mill, where it is delivered into a dressing apparatus. (Shown in Figs. 12 and 13.) After this dressing the unfinished material or grist is delivered by suitable means into the centrifugal feed apparatus $E'$, which feeds the same to the second grinding-rollers, $B^2$, for the second grinding process, and it falls from these over an inclined plane onto the worm $C'$, which is fixed on the beater-shaft of the dressing apparatus $D'$, and which delivers the material into the latter. After this second dressing the coarse material that has not passed through the screening-surface is delivered at the end of the machine in the centrifugal feed apparatus $E^2$, which is or may be fixed on the shaft of the dressing apparatus, and which throws the grist by its centrifugal force into the feed-channel $v'$, and thereby into the next grinding-rollers, $B^3$, Figs. 4 and 13. After the unfinished material has been ground or rolled for the third time by the last-mentioned rollers it falls over another inclined surface onto the worm $C^2$ of the next dressing apparatus, $D^2$, from the end of which the coarse meal is again subjected to the action of the centrifugal feed apparatus $E^3$, which delivers it in the before-described manner to the grinding-rollers $B^4$. After this fourth grinding (if the machine be constructed as shown in the drawings) the meal is delivered into an elevator, $H'$, Figs. 11, 12, 13, and is raised by this into the dressing apparatus $D^3$. Here the flour and groats are again separated, and the coarse groats are delivered in the before-described manner, by the centrifugal feed apparatus $E^4$, to the grinding-rollers $B^5$ for the last grinding process.

From what has been so far described it will be seen that the delivery and distribution of the grist by the action of a centrifugal feed apparatus, without regard to the more or less considerable quantity of grist delivered, will always be uniformly alike, and an injurious accumulation of the said grist on the grinding rollers need not be feared; but it may happen that in consequence of a driving-belt coming off or getting in disorder, or from similar causes, one pair or other of grinding-rollers may come to a stop, while the centrifugal feed apparatus, rotating independently of the same, will operate as before, and will continue throwing grist into the said rollers. If such accident will happen, it becomes necessary to move asunder the said pair of grinding-rollers, in order to make room for the grist accumulating on the same. In some mechanism heretofore applied for thus moving asunder such grinding-rollers said movement is caused by means of an eccentric or a screw; but this is always performed in such manner as to compress the spring producing the yielding pressure on the said rollers. Neither did the former construction of such mechanism allow of regulating the tension or pressure of the said spring during the operation of the machine. It will be seen that thus compressing the spring, as above stated, will injure its uniform tension, while on the other side the compressed spring allows only of obtaining a very limited opening between the said rollers. Now I propose to so construct the said mechanism for controlling the yielding pressure of the grinding-rollers that the distance between the said rollers can be regulated without changing or altering the tension of the said spring, which gives me a uniform pressure in any position of the grinding-rollers, and that the tension of the said spring itself can be regulated at liberty and at any time while the machine is in operation. The mechanism which I propose to apply for the said purpose is illustrated in Figs. 6 and 8 of the annexed drawings; but I make no claim in this application to the manner of and means employed for maintaining the same yielding pressure of the adjustable roller with relation to the fixed one irrespective of its adjustment, nor to the manner of and means employed for adjusting said movable roller, as it is my purpose to file a separate application for United States Letters Patent based upon the features here disclaimed.

Having fully described my invention, what I claim as new, and desire to secure by Letters Patent, is—

1. A centrifugal feed apparatus for grinding-mills and the like, consisting in the combination of the revolving blades or beaters with the casing, having suitable feed and exit openings, through which the material passes, substantially as before set forth.

2. In machinery for converting grains into flour, the combination, with dressing apparatus and grinding-rollers, of centrifugal feed apparatus adapted to receive grain at its axis and discharge it tangentially, for the purpose of direct feed and distribution of the material from the dressing apparatus onto the grinding-rollers, substantially as set forth.

3. A centrifugal feed apparatus for grinding-mills, substantially as before set forth, consisting of beaters fixed radially on a shaft in line with its axis, and a casing therefor, a portion of said beaters being straight and a portion of them being twisted, so that their outer ends will stand diagonally to the axial line of said shaft, and the casing being provided with an inlet-opening at one end near the shaft and an outlet-opening beyond the periphery of the beaters.

In testimony whereof I have signed my name to this specification in the presence of two subscribing witnesses.

HEINRICH SECK.

Witnesses:
FRANZ HASSLACHER,
JOSEPH PATRICK.